(12) United States Patent
Nagesh et al.

(10) Patent No.: US 12,333,757 B2
(45) Date of Patent: Jun. 17, 2025

(54) VEHICLE POSE MANAGEMENT

(71) Applicant: Ford Global Technologies, LLC, Dearborn, MI (US)

(72) Inventors: Sushruth Nagesh, Mountain View, CA (US); Shubham Shrivastava, Santa Clara, CA (US); Punarjay Chakravarty, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 17/745,920

(22) Filed: May 17, 2022

(65) Prior Publication Data

US 2023/0419539 A1  Dec. 28, 2023

(51) Int. Cl.
*G06T 7/73*  (2017.01)

(52) U.S. Cl.
CPC ...... *G06T 7/74* (2017.01); *G06T 2207/20081* (2013.01)

(58) Field of Classification Search
CPC ............. G06T 7/74; G06T 2207/20081; G06T 2207/30208; G06T 2207/30244; G06T 2207/30252; G06T 7/73; G06T 7/13; G06T 2207/10004; G06T 2207/30248
See application file for complete search history.

(56) References Cited

U.S. PATENT DOCUMENTS

| | | | |
|---|---|---|---|
| 2020/0098131 A1* | 3/2020 | Rivera | G06T 7/73 |
| 2020/0334857 A1 | 10/2020 | Garud et al. | |
| 2021/0090242 A1 | 3/2021 | Hever et al. | |
| 2022/0044441 A1* | 2/2022 | Kalra | G06T 7/579 |

FOREIGN PATENT DOCUMENTS

| | | | |
|---|---|---|---|
| CN | 109087323 A | 12/2018 | |
| CN | 112150547 A | 12/2020 | |
| CN | 113793297 A | 12/2021 | |

* cited by examiner

*Primary Examiner* — Jianxun Yang
(74) *Attorney, Agent, or Firm* — Frank A. MacKenzie; Brooks Kushman P.C.

(57) ABSTRACT

A computer includes a processor and a memory, and the memory stores instructions executable by the processor to receive at least one image frame from at least one camera, the at least one image frame showing a vehicle; determine at least one baseline pixel coordinate within one image frame for the vehicle; initialize a plurality of initial poses for the vehicle in a preset pattern; for each initial pose, determine a respective final pose by minimizing a reprojection error between the at least one baseline pixel coordinate and at least one respective estimated pixel coordinate, the at least one respective estimated pixel coordinate resulting from reprojecting the vehicle to pixel coordinates in the one image frame; and select a first final pose from the final poses, the first final pose having the lowest minimized reprojection error of the final poses.

20 Claims, 6 Drawing Sheets

VEHICLE POSE MANAGEMENT

BACKGROUND

A pose is a position and orientation of an object, e.g., a vehicle. Camera data about an object can be used to determine the object pose. A vehicle pose can depend on its environment. For example, the vehicle may be manufactured on an assembly line having a plurality of workstations. Each workstation typically adds the same part(s) or performs the same operation on each partially finished product in turn.

DETAILED DESCRIPTION

Figure 1:
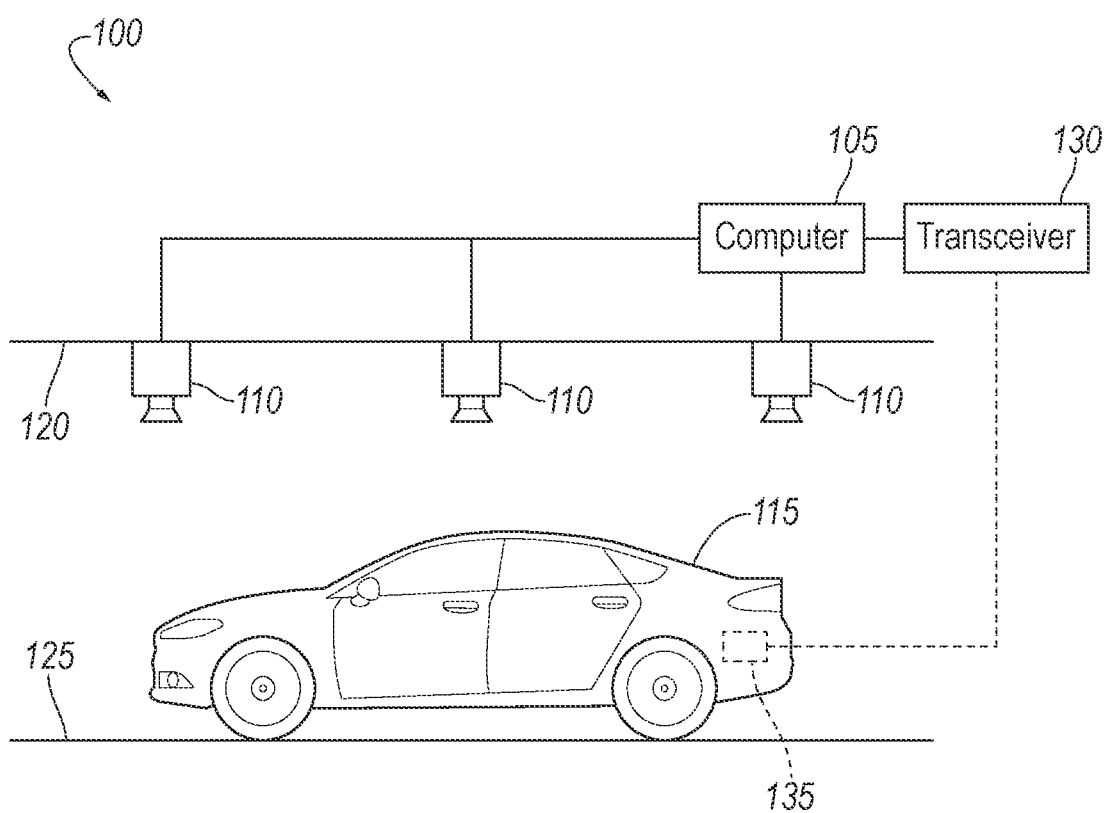
FIG. 1 is a side diagrammatic view of an example vehicle moving through an example facility.

This disclosure relates to determining a pose of a vehicle based on image data from one or more cameras that show the vehicle. For example, the pose of a vehicle can be determined as the vehicle moves through an assembly line in a facility, and if the vehicle is an autonomous vehicle for which the powertrain has already been assembled, the vehicle can be instructed to move itself based on the pose. The facility can include a plurality of cameras, and the vehicle can move within view of one or more of those cameras in turn. A computer of the facility can be programmed to receive an image frame from one of the cameras showing the vehicle and determine baseline pixel coordinates within the image frame for the vehicle. Pixel coordinates are two-dimensional locations within the image frame. The baseline pixel coordinates can be of landmarks on the vehicle such as a corner of a headlight or an edge of a side-view mirror. Then the computer can initialize a plurality of initial poses for the vehicle in a preset pattern and determine a respective final pose for each initial pose. The initial poses can serve as starting points for, e.g., an optimization process that determines the final poses. Determining each final pose can include iteratively reprojecting the landmarks of the vehicle from an estimated pose (starting with the respective initial pose) to estimated pixel coordinates in the image frame and minimizing a reprojection error between the baseline pixel coordinates and the respective estimated pixel coordinates. Next, the computer can select one of the final poses as the best estimate of the pose of the vehicle. The selected final pose can have a lowest minimized reprojection error of the final poses. The selected final pose can be highly accurate, e.g., within a few centimeters. The computer can use the selected final pose to, e.g., instruct the vehicle to move. The high accuracy of the selected final pose can be useful for granular instructions for moving the vehicle with a high degree of control.

A computer includes a processor and a memory, and the memory stores instructions executable by the processor to receive an image frame from a camera, the image frame showing a vehicle; determine at least one baseline pixel coordinate within the image frame for the vehicle; initialize a plurality of initial poses for the vehicle in a preset pattern; for each initial pose, determine a respective final pose by minimizing a reprojection error between the at least one baseline pixel coordinate and at least one respective estimated pixel coordinate; and select a first final pose from the final poses, the first final pose having the lowest minimized reprojection error of the final poses, the at least one respective estimated pixel coordinate results from reprojecting the vehicle to pixel coordinates in the image frame.

The instructions may further include instructions to transmit a message to the vehicle based on the first final pose, the message usable for actuating the vehicle. The instructions may further include instructions to determine at least one waypoint based on the first final pose, and the message to the vehicle includes the at least one waypoint.

The initial poses and final poses may each include two horizontal spatial dimensions and yaw. The initial poses and final poses may each include a vertical spatial dimension, roll, and pitch.

The preset pattern may be a grid.

The instructions may further include instructions to identify at least one landmark of the vehicle in the image frame, the at least one baseline pixel coordinate may be of the at least one landmark, and the estimated pixel coordinates may be of the at least one landmark. The at least one landmark may include a plurality of landmarks, the at least one baseline pixel coordinate may include a plurality of respective baseline pixel coordinates, and the estimated pixel coordinates may include, for each baseline pixel coordinate, a plurality of respective estimated pixel coordinates.

The instructions may further include instructions to, upon determining that the lowest minimized reprojection error exceeds a threshold, re-identify the at least one landmark in the image frame.

Identifying the at least one landmark may include executing a machine-learning program.

The instructions may further include instructions to, upon determining that the lowest minimized reprojection error exceeds a threshold, discard the first final pose.

The image frame may be a first image frame, the camera may be a first camera, the instructions may further include instructions to receive a second image frame from a second camera, and the at least one baseline pixel coordinate may include a first baseline pixel coordinate in the second image frame. The second image frame may be time-synchronized with the first image frame.

The at least one respective estimated pixel coordinate may include a first estimated pixel coordinate corresponding to the first baseline pixel coordinate.

The instructions may further include instructions to identify a first landmark of the vehicle in the first image frame and a second landmark of the vehicle in the second image frame, the at least one baseline pixel coordinate may be of the first and second landmarks, and the estimated pixel coordinates may be of the first and second landmarks. The second landmark may be outside the first image frame.

Reprojecting the vehicle to pixel coordinates in the image frame may be based on a three-dimensional model of the vehicle.

Minimizing the reprojection error may include performing iterative optimization.

The camera may be positioned above the vehicle and oriented facing downward.

A method includes receiving an image frame from a camera, the image frame showing a vehicle; determining at least one baseline pixel coordinate within the image frame for the vehicle; initializing a plurality of initial poses for the vehicle in a preset pattern; for each initial pose, determining a respective final pose by minimizing a reprojection error between the at least one baseline pixel coordinate and at least one respective estimated pixel coordinate; and selecting a first final pose from the final poses, the first final pose having the lowest minimized reprojection error of the final poses. The at least one respective estimated pixel coordinate results from reprojecting the vehicle to pixel coordinates in the image frame.

With reference to the Figures, wherein like numerals indicate like parts throughout the several views, a computer 105 includes a processor and a memory, and the memory stores instructions executable by the processor to receive at least one image frame 200 from at least one camera 110, the at least one image frame 200 showing a vehicle 115; determine at least one baseline pixel coordinate within one image frame 200 for the vehicle 115; initialize a plurality of initial poses 405 for the vehicle 115 in a preset pattern 400; for each initial pose 405, determine a respective final pose by minimizing a reprojection error between the at least one baseline pixel coordinate and at least one respective estimated pixel coordinate, the at least one respective estimated pixel coordinate resulting from reprojecting the vehicle 115 to pixel coordinates in the one image frame 200; and select a first final pose from the final poses, the first final pose having the lowest minimized reprojection error of the final poses.

With reference to FIG. 1, the vehicle 115 may be any passenger or commercial automobile such as a car, a truck, a sport utility vehicle, a crossover, a van, a minivan, a taxi, a bus, etc.

The vehicle 115 may be an autonomous vehicle. A vehicle computer 135 can be programmed to operate the vehicle 115 independently of the intervention of a human operator, completely or to a lesser degree. The vehicle computer 135 may be programmed to operate a propulsion system, a brake system, a steering system, and/or other vehicle systems. For the purposes of this disclosure, autonomous operation means the vehicle computer 135 controls the propulsion system, brake system, and steering system without input from a human operator; semi-autonomous operation means the vehicle computer 135 controls one or two of the propulsion system, brake system, and steering system and a human operator controls the remainder; and nonautonomous operation means a human operator controls the propulsion system, brake system, and steering system.

The vehicle computer 135 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 135 can thus include a processor, a memory, etc. The memory of the vehicle computer 135 can include media for storing instructions executable by the processor as well as for electronically storing data and/or databases, and/or the vehicle computer 135 can include structures such as the foregoing by which programming is provided. The vehicle computer 135 can be multiple computers coupled together.

The vehicle 115 can be in a facility 100. The facility 100 can be a structure, e.g., a building or a series of buildings, at which the vehicle 115 is manufactured, assembled, operated on, repaired, upgraded, etc. The facility 100 can include a ceiling 120 positioned above the vehicle 115 and a floor 125 on which the vehicle 115 can travel.

The facility 100 can include the computer 105. The computer 105 is a microprocessor-based computing device, e.g., a generic computing device including a processor and a memory. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The facility 100 includes at least one camera 110, e.g., a plurality of the cameras 110, communicatively coupled to the computer 105. The cameras 110 can detect electromagnetic radiation in some range of wavelengths. For example, the cameras 110 may detect visible light, infrared radiation, ultraviolet light, or some range of wavelengths including visible, infrared, and/or ultraviolet light. For example, the cameras 110 can be a charge-coupled devices (CCD), complementary metal oxide semiconductors (CMOS), or any other suitable type.

At least one camera 110, e.g., the cameras 110, can be positioned above the vehicle 115 and oriented facing downward, either diagonally downward or straight downward. For example, the cameras 110 can be mounted to the ceiling 120 of the facility 100. A center of the field of view of each camera 110 can be a vertical line downward to the floor 125 of the facility 100. The cameras 110 can be arranged to have overlapping fields of view, such that the vehicle 115 can be within the fields of view of multiple cameras 110 at once. The cameras 110 can be arranged to provide coverage of the floor 125 of the facility 100, or of at least a portion of the floor 125 on which the vehicle 115 can travel.

The facility 100 can include a transceiver 130 communicatively coupled to the computer 105. The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote computer, that is, a computer distinct and spaced from the transceiver 130, e.g., distinct from the facility 100. For example, the remote computer can be the vehicle 115, e.g., the vehicle computer 135 of the vehicle 115. The transceiver 130 may be one device or may include a separate transmitter and receiver.

Figure 2A:
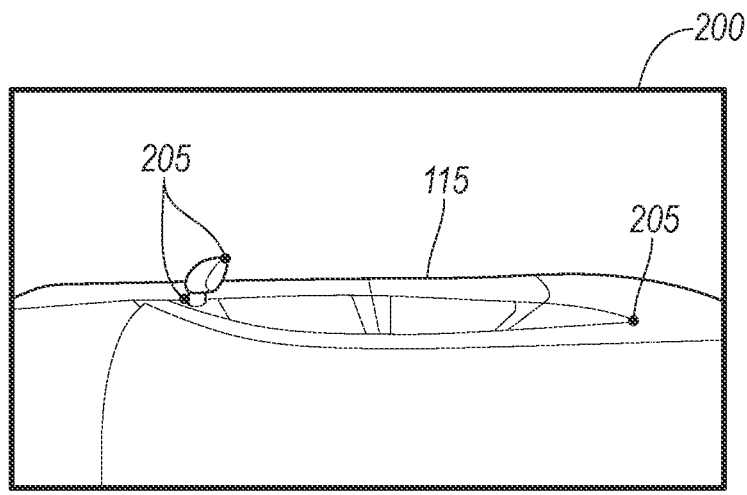
FIGS. 2A-C are time-synchronized image frames of the vehicle from cameras of the facility.
Figure 2B:
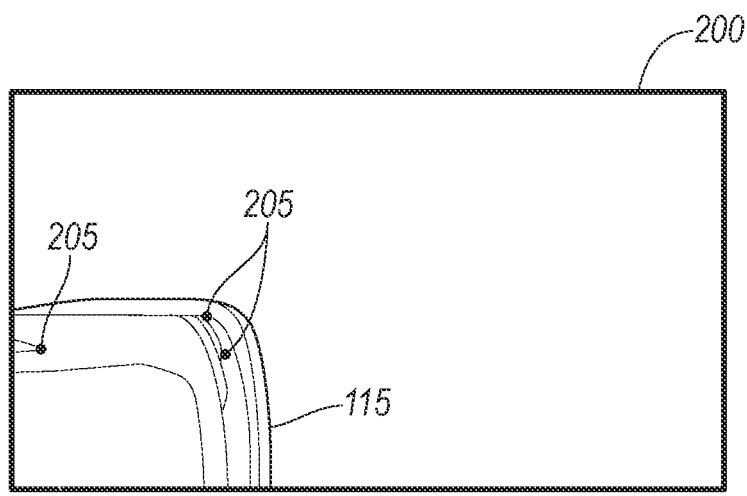
Figure 2C:
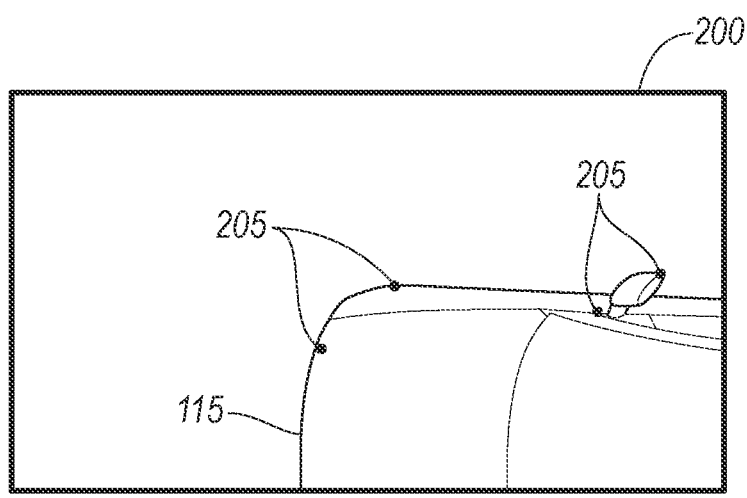

With reference to FIGS. 2A-C, the computer 105 can receive image data from the cameras 110. The image data are sequences of the image frames 200 of the fields of view of the respective cameras 110. Each image frame 200 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame 200 can be specified in pixel coordinates, e.g., an ordered pair of pixel distances, such as a number of pixels from a top edge and a number of pixels from a left edge of the image frame 200. The image frames 200 can show the vehicle 115, fully or partially.

The computer 105 can be programmed to receive at least one image frame 200 from one of the cameras 110, e.g., a plurality of the image frames 200 from the cameras 110. The plurality of the image frames 200 can be time-synchronized, i.e., captured at a same time. For example, the plurality of the image frames 200 can include a first image frame 200, a second image frame 200, a third image frame 200, etc., and the second image frame 200, third image frame 200, etc. can be time-synchronized with the first image frame 200. The time-synchronization of the image frames 200 can be useful because the vehicle 115 can move over time and the time-synchronized image frames 200 ensure that the pose is the same for each of the image frames 200. One of the time-synchronized image frames 200 can be designated as a reference image frame 200, e.g., the image frame 200 with the largest number of pixels occupied by the vehicle 115.

At any given time, the vehicle 115 can be characterized by a pose. For the purposes of this disclosure, a pose is defined as a description of the position and/or orientation of something, e.g., the vehicle 115. The pose can be represented as a vector of values for dimensions of the position and/or the orientation of the vehicle 115. Dimensions of the position can include two horizontal spatial dimensions x, y and a vertical spatial dimension z. Dimensions of the orientation can include yaw $\psi$, roll $\varphi$, and pitch $\theta$. The yaw $\psi$ can be an angular dimension about the z-axis, the roll $\varphi$ can be an angular dimension about the x-axis, and the pitch $\theta$ can be an angular dimension about the y-axis. The pose can include the two horizontal spatial dimensions x, y and the yaw $\psi$. For example, the pose can include only the two horizontal spatial dimensions x, y and the yaw $\psi$, e.g., when the floor 125 of the facility 100 is flat and level so that the vertical spatial dimension z, the roll $\varphi$, and the pitch $\theta$ are already known. For another example, the pose can include the vertical spatial dimension z, the roll $\varphi$, and the pitch $\theta$ in addition to the two horizontal spatial dimensions x, y and the yaw $\psi$. The pose can alternatively and equivalently be represented as a transformation matrix that transforms from the reference frame of the vehicle 115 to a reference frame of the facility 100, e.g., of one of the cameras 110. The transformation matrix can be a 3×4 matrix that include a 3×3 rotation matrix $R_v$ and a 3×1 translation vector $T_v$, i.e., $[R_v|T_v]$. The transformation matrix can include the two horizontal spatial dimensions x, y and the yaw $\psi$, and may or may not also include the vertical spatial dimension z, the roll $\psi$, and the pitch $\theta$.

The computer 105 can be programmed to identify at least one landmark 205 of the vehicle 115 in the plurality of the image frames 200, e.g., a plurality of landmarks 205. For the purposes of this disclosure, a "landmark" is defined as a recognizable feature of something. The landmarks 205 can be points defined by edges and/or corners of components of the vehicle 115. For example, the landmarks 205 can include an outboard edge of the side-view mirror, a base of the side-view mirror (as both shown in FIGS. 2A and 2C), a rear corner of a rear side window (as shown in FIGS. 2A-B), inboard and outboard corners of a taillight (as shown in FIG. 2B), a corner of a bumper, a corner of a grill (as both shown in FIG. 2C), etc. The landmarks 205 can be inside one or more of the plurality of the image frames 200 and simultaneously outside of others of the plurality of the image frames 200; e.g., the outboard edge of the side-view mirror is inside the image frames 200 of FIGS. 2A and 2C and outside the image frame 200 of FIG. 2B.

Identifying the landmarks 205 can include executing a machine-learning program. The machine-learning program can be any suitable type for receiving image data as input and generating a classification as output, e.g., a neural network such as a convolutional neural network. The classification can be the qualitative location of the landmark 205 on the vehicle 115, e.g., outboard edge of the side-view mirror, the rear corner of the rear side window, etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential classification, and the final output is the classification with the highest score. The machine-learning program can be trained on a dataset of image frames 200 with the landmarks 205 selected and coded manually by a technician. The manual coding of the landmarks 205 serves as ground truth that the machine-learning program is trained to replicate.

The computer 105 can be programmed to determine the baseline pixel coordinates within the respective image frames 200. The baseline pixel coordinates can be of the landmarks 205. The output can include a baseline pixel coordinate for each appearance of a landmark 205 in in the plurality of the image frames 200, e.g., a landmark 205 appearing in two image frames 200 will receive two baseline pixel coordinates, one for each image frame 200 in which that landmark 205 appears. For example, the machine-learning program described above can output the baseline pixel coordinates paired with the classifications of the landmarks 205. The machine-learning program can be trained on a dataset of image frames 200 with pixel coordinates for the landmarks 205 selected and coded manually by a technician. The manual selection of the pixel coordinates serves as ground truth that the machine-learning program is trained to replicate.

Figure 3:
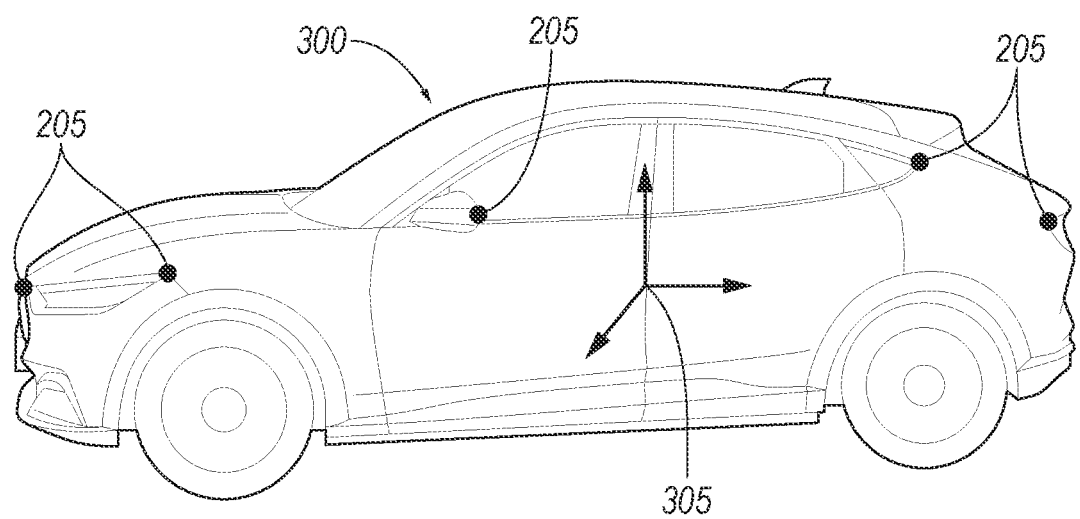
FIG. 3 is a side view of an example three-dimensional model of the vehicle.

With reference to FIG. 3, the computer 105 can store a three-dimensional model 300 of the vehicle 115. The three-dimensional model 300 specifies the relative positions of the landmarks 205 to the rest of the vehicle 115. For example, the three-dimensional model 300 can include an origin point 305 relative to which other points of the vehicle 115 are described. The origin point 305 can be, e.g., a center of gravity of the vehicle 115 or a center of a rear axle of the vehicle 115. The computer 105 can geometrically determine an absolute position, e.g., a position relative to the facility 100 rather than to the vehicle 115, of one of the landmarks 205 by using a pose of the vehicle 115. The pose of the vehicle 115 can specify the absolute position of the origin point 305 and the orientation of the vehicle 115.

Figure 4A:
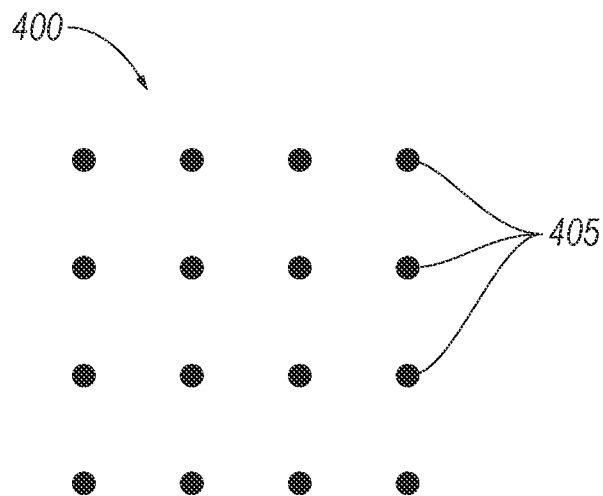
FIGS. 4A-B are diagrams of example preset patterns of a plurality of initial poses of the vehicle.
Figure 4B:
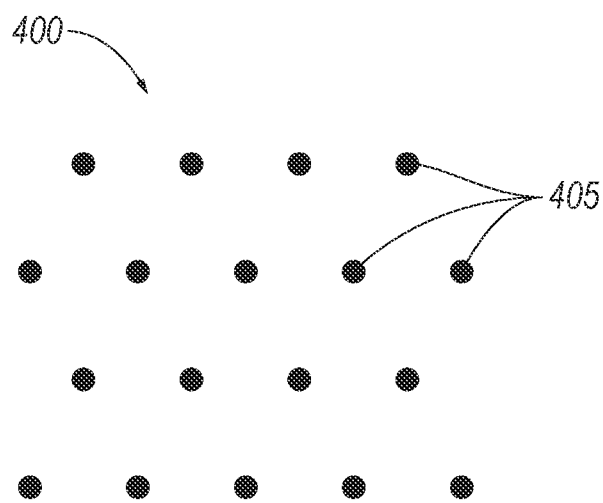

With reference to FIGS. 4A-B, the computer 105 can be programmed to initialize a plurality of the initial poses 405 for the vehicle 115 in a preset pattern 400. The number of the initial poses 405 can be a preset number (e.g., 16 as shown in FIG. 4A or 18 as shown in FIG. 4B), irrespective of the number of time-synchronized image frames 200 in which the vehicle 115 appears, i.e., the number of initial poses 405 is the same regardless of whether the vehicle 115 appears in, say, three image frames 200 at once or four image frames 200 at once. The initial poses 405 can be spread over a horizontal area in the facility 100. The initial poses 405 can be based on the baseline pixel coordinates, e.g., a first initial pose 405 can be generated by a mapping from the baseline pixel coordinates of the landmark 205, and the remaining initial poses 405 can be spread over a region centered on the first initial pose 405. Alternatively, the initial poses 405 can be initialized irrespective of the baseline pixel coordinates, e.g., can be the same whenever the vehicle 115 appears in the image frame 200 of a given camera 110. For example, the initial poses 405 can be generated based on which camera 110 captured the reference image frame 200.

The initial poses 405 can vary in a systematic way from each other according to the preset pattern 400. For example, the preset pattern 400 can be a grid, e.g., a square grid as shown in FIG. 4A or a hexagonal grid as shown in FIG. 4B. The initial poses 405 can be evenly spaced in one or more of the spatial dimensions, e.g., can be evenly spaced in the two horizontal spatial dimensions x, y. The preset pattern 400 can reduce a likelihood that, when minimizing a reprojection error as described below, the result is a local minimum that is not the global minimum.

The computer 105 can be programmed to reproject the vehicle 115 to pixel coordinates in an image frame 200. In particular, the computer 105 can be programmed to, for each appearance of a landmark 205 in one of the plurality of image frames 200, reproject the position of the landmark 205 to pixel coordinates, e.g., in the image frame 200 that captured that appearance of the landmark 205. The result is referred to herein as the estimated pixel coordinates. For example, the computer 105 can use the following equations to reproject all the appearances of the landmarks 205 into pixel coordinates:

$$x_{proj} = PX_v$$

$$P = K_{cam}[R_n|T_n][R_v|T_v]$$

in which $x_{proj}$ is a vector of the estimated pixel coordinates of the landmarks 205 in the respective image frames 200; P is the projection matrix, $X_v$ is a vector of the three-dimensional positions of the landmarks 205; $K_{cam}$ is the intrinsic matrix of the camera 110 that captured the reference image frame 200; $[R_n|T_n]$ is the extrinsic pose matrix of the nth camera 110, i.e., the transformation matrix from the camera 110 that captured the image frame 200 showing the landmark 205 to the camera 110 that captured the reference image frame 200; and $[R_v|T_v]$ is the pose of the vehicle 115 with respect to the camera 110 that captured the reference frame image 200, e.g., represented as a transformation matrix from the reference frame of the vehicle 115 to the reference frame of the camera 110 that captured the reference image frame 200. The vector $x_{proj}$ is a concatenation of all the two-dimensional estimated pixel coordinates of the appearances of the landmarks 205, meaning the vector $x_{proj}$ has length 2N if there are N appearances of landmarks 205. The computer 105 can determine the three-dimensional positions $X_v$ of the landmarks 205 based on the three-dimensional model 300 of the vehicle 115 as described above. The intrinsic matrix $K_{cam}$ of the camera 110 is known from calibration of the camera 110 and may be provided by a manufacturer of the camera 110. The transformation matrix $[R_n|T_n]$ between the camera 110 that captured the image frame 200 showing the landmark 205 and the camera 110 that captured the reference image frame 200 can be known from calibrating the cameras 110 after installation in the facility 100. If the image frame 200 showing the landmark 205 is the same as the reference image frame 200, then the transformation matrix $[R_n|T_n]$ is the identity matrix.

The computer 105 can be programmed to determine the reprojection error between the baseline pixel coordinates of the appearances of the landmarks 205 and the estimated pixel coordinates of the appearances of the landmark 205 for a given initial pose 405. For example, the reprojection error can be a least square error, e.g., $\mu \| x_{proj} - x_{actual} \|^2$, in which $x_{proj}$ is the estimated pixel coordinates, $x_{actual}$ is the baseline pixel coordinates, and $\|\cdot\|$ is the norm of a vector. Like the vector $x_{proj}$ described above, the vector $x_{actual}$ is a concatenation of all the two-dimensional baseline pixel coordinates of the appearances of the landmarks 205, meaning the vector $x_{actual}$ has length 2N if there are N appearances of landmarks 205.

The computer 105 can be programmed to minimize the reprojection error between the baseline pixel coordinates and the estimated pixel coordinates by determining the pose that results in the minimal reprojection error:

$$\min_{R_v, T_v} \| x_{proj} - x_{actual} \|^2$$

For example, the computer 105 can use a process of iterative optimization by adjusting the pose, reprojecting the position of the landmark 205 to arrive at new estimated pixel coordinates as described above, and calculating the reprojection error with the new estimated pixel coordinates. The iterative optimization process can be any suitable algorithm for solving a nonlinear least squares problem, e.g., gradient descent, Newton's method, the Levenberg-Marquardt algorithm, the Gauss-Newton method, etc.

As one example, the computer 105 can minimize the reprojection error by using the Levenberg-Marquardt algorithm. At each iteration, the pose equals the sum of the pose from the previous iteration and a descent vector in the direction of the steepest descent of the reprojection error, with the descent vector possibly multiplied by a step size:

$$R_v^{k+1}, T_v^{k+1} = R_v^k, T_v^k + \alpha^k \delta(R_v, T_v)$$

in which the superscripts refer to the iteration, k is an index of the iteration, $\alpha$ is the step size, and $\delta$ is the descent vector. The pose used for the first iteration is the initial pose 405; as described below, the minimization can be performed multiple times, once for each initial pose 405. The step size $\alpha$ can be chosen to promote fast convergence without overshooting the solution, e.g., 1. The descent vector $\delta$ can be defined by the following equation, which uses the Jacobian J of the difference e between the estimated and baseline pixel coordinates. The Jacobian matrix of a vector-valued function is the matrix of all the function's first-order partial derivatives. The matrix product of the transpose of the Jacobian $J^T$ and the Jacobian J is summed with a damping matrix $\lambda D$, and that sum is multiplied by the descent vector $\delta$. That product equals the negative transpose of the Jacobian $J^T$ multiplied by the difference e between the estimated and baseline pixel coordinates, from which the descent vector $\delta$ can be inferred, as seen in the following equation:

$$(J(e(R_v, T_v))^T J(e(R_v, T_v)) + \lambda D) \delta(R_v, T_v) = -J(e(R_v, T_v))^T e(R_v, T_v)$$

$$e(R_v, T_v) = x_{proj} - x_{actual}$$

in which $\lambda$ is a damping factor and D is a matrix with the diagonal values set to the diagonals of $J^T J$ and the rest of the matrix set to zeroes. The damping factor λ can be chosen to promote fast convergence without overshooting the solution. The damping factor λ can vary based on whether the reprojection error increased or decreased in the previous iteration, e.g., by decreasing when the reprojection error decreased and increasing when the reprojection error increased. The variable damping factor λ can help prevent the algorithm from settling on a local minimum that is not the global minimum. The algorithm can execute for a preset number of iterations k or until the descent vector δ or the reduction in the reprojection error falls below a preset value, up to a maximum number of iterations k. The preset value can be chosen to indicate that the pose is sufficiently accurate for directing movement of the vehicle 115, as described below. The final pose is the value of $R_v$, $T_v$ after the final iteration.

The computer 105 can be programmed to determine a final pose by minimizing the reprojection error multiple times, once for each of the initial poses 405 generated above. Each of the final poses will have a corresponding minimized reprojection error, which is the reprojection error at the final step of the iterative optimization process. The computer 105 can be programmed to select a first final pose from the final poses, the first final pose having the lowest minimized reprojection error of the final poses. Selecting the first final pose from multiple final poses can avoid solutions stuck at local minima.

The computer 105 can be programmed to determine whether the lowest minimized reprojection error exceeds a threshold. The threshold can be chosen to indicate that the iterative optimization process did not converge for any of the final poses. A lack of convergence can occur if the machine-learning program incorrectly identifies the landmarks 205. The computer 105 can be programmed to, upon determining that the lowest minimized reprojection error exceeds the threshold, discard the first final pose. In other words, the computer 105 does not rely on the first final pose or use the first final pose for any decision-making. In that case, the computer 105 can rely on a previously determined first final pose, or the computer 105 can re-identify the landmarks 205 in the image frames 200 so as to follow the steps above to redetermine the first final pose.

Figure 5:
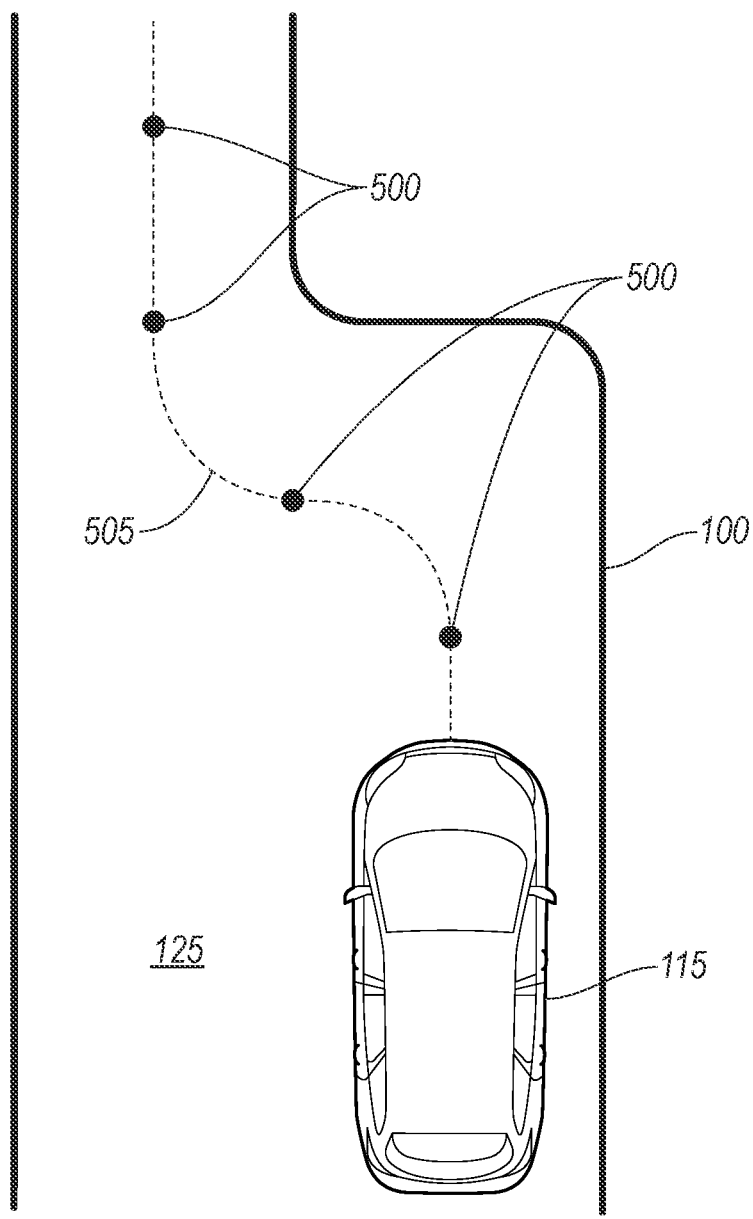
FIG. 5 is a top view of an example path that the vehicle follows through the facility.

With reference to FIG. 5, the computer 105 can determine a message and transmit the message to the vehicle 115 based on the first final pose. The computer 105 can transmit the message via the transceiver 130. The message can be usable by the vehicle 115 for actuating the vehicle 115. For example, the computer 105 can determine at least one waypoint 500, e.g., a plurality of waypoints 500 defining a path 505, based on the first final pose, and the message can include the at least one waypoint 500. The computer 105 can determine the waypoints 500 based on the first final pose of the vehicle 115, a planned destination for the vehicle 115, the three-dimensional model 300 of the vehicle 115, and a two-dimensional or three-dimensional model of the facility 100. For example, the computer 105 can choose the waypoints 500 so that the vehicle 115 will travel along the path 505 to the planned destination such that the three-dimensional model 300 of the vehicle 115 does not intersect the model of the facility 100 anywhere along the path 505, e.g., using known path-planning algorithms. For another example, the message can include the first final pose, the planned destination, and the two-dimensional or three-dimensional model of the facility 100. The first final pose specifies a location of the vehicle 115 in a reference frame of the model of the facility 100.

Once the vehicle 115 receives the message, the vehicle 115 can autonomously navigate itself along the path 505 through the waypoints 500. For example, the vehicle computer 135 can be programmed to actuate the vehicle 115 to travel along the path 505 through the waypoints 500, e.g., to actuate the propulsion system, the brake system, and the steering system to navigate the vehicle 115 to each waypoint 500 in turn. The vehicle computer 135 can use algorithms for local path-planning, as are known, to navigate between each pair of consecutive waypoints 500. For another example, if the message includes the first final pose, the planned destination, and the model of the facility 100, the vehicle computer 135 can be programmed to determine the waypoints 500 and/or the path 505 so that the vehicle 115 will travel along the path 505 to the planned destination and the vehicle 115 will not intersect the facility 100 anywhere along the path 505. The vehicle computer 135 can use known global path-planning algorithms. The vehicle computer 135 can determine the possible intersections to avoid based on the model of the facility 100 and the first final pose specifying the location of the vehicle 115 relative to the model of the facility 100. The vehicle computer 135 can then actuate the propulsion system, the brake system, and the steering system to navigate the vehicle 115 along the path 505.

Alternatively or additionally to transmitting the message, the computer 105 can be programmed to instruct a component of the facility 100 to actuate based on the first final pose. For example, the computer 105 can instruct a siren or other warning device to actuate if the vehicle 115 is less than a threshold distance from a predesignated area of the facility, e.g., a wall or a walkway. The computer 105 can determine whether the vehicle 115 is less than the threshold distance from the predesignated area based on the first final pose, the three-dimensional model 300 of the vehicle 115, and the model of the facility 100.

Figure 6:
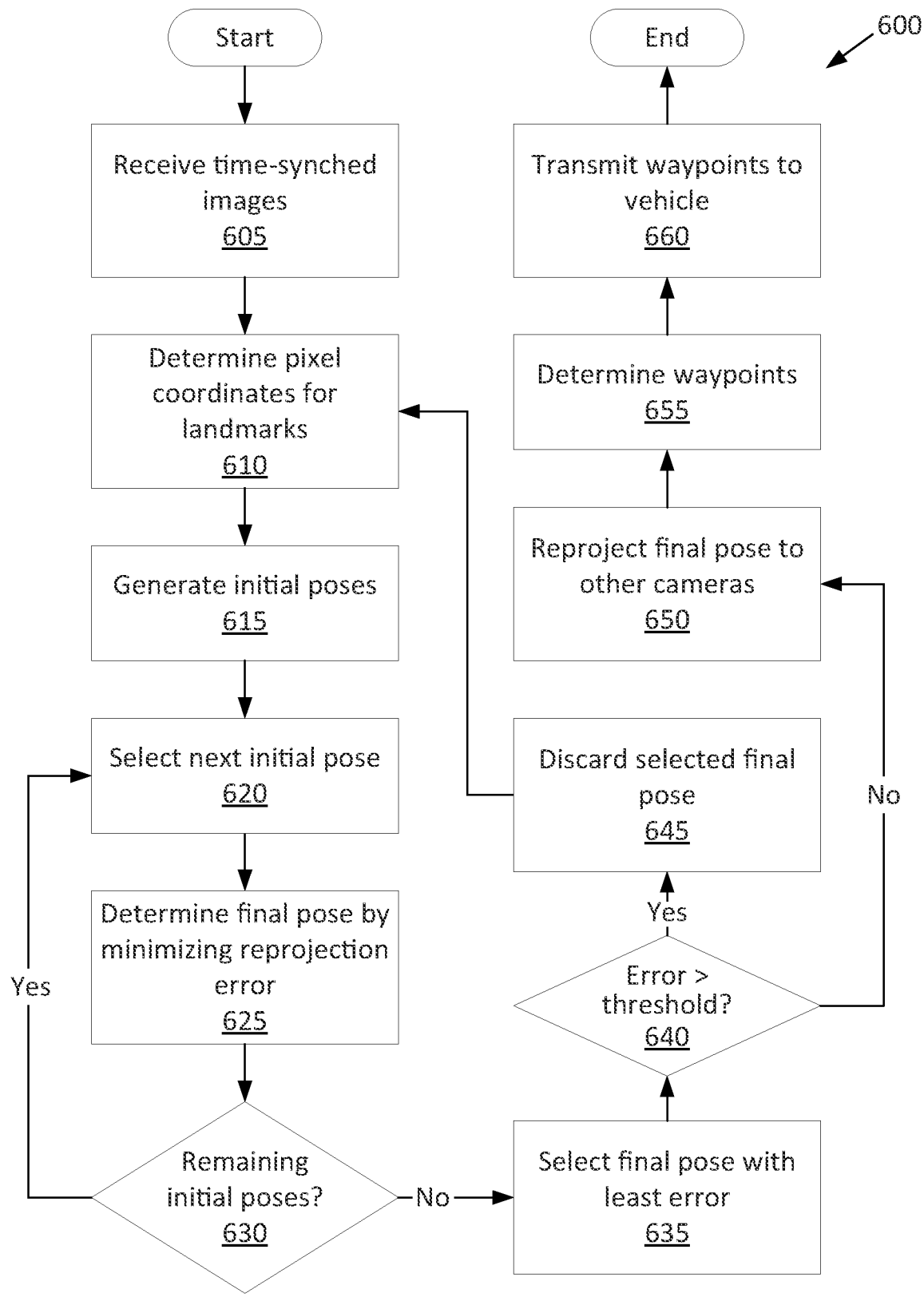
FIG. 6 is a process flow diagram of an example process for determining a pose of the vehicle.

FIG. 6 is a process flow diagram illustrating an exemplary process 600 for determining the pose of the vehicle 115. The memory of the computer 105 stores executable instructions for performing the steps of the process 600. As a general overview of the process 600, the computer 105 receives the time-synchronized image frames 200 from the cameras 110, determines the baseline pixel coordinates of the landmarks 205, and initializes the initial poses 405. For each initial pose 405, the computer 105 determines the corresponding final pose by minimizing the reprojection error. The computer 105 selects the final pose having the lowest minimized reprojection error. If the lowest minimized reprojection error is above the threshold, the computer 105 discards the selected final pose. Otherwise, the computer 105 reprojects the final pose to the image frames 200, determines the waypoints 500, and transmits the message including the waypoints 500 to the vehicle 115.

The process 600 begins in a block 605, in which the computer 105 receives the time-synchronized image frames 200 from the cameras 110, as described above. Alternatively, the computer 105 can receive a single image frame 200 from one camera 110, from which the rest of the process 600 can still be performed.

Next, in a block 610, the computer 105 identifies the landmarks 205 in the image frames 200 and determines the baseline pixel coordinates for each appearance of the landmarks 205 in the image frames 200, as described above.

Next, in a block 615, the computer 105 initializes the plurality of the initial poses 405 for the vehicle 115 in the preset pattern 400, as described above.

Next, in a block 620, the computer 105 selects a next initial pose 405 from the plurality of the initial poses 405. For example, each of the initial poses 405 can be assigned an index, and the computer 105 can select the initial pose 405 with the next highest index, starting with the lowest index.

Next, in a block 625, the computer 105 determines the final pose for the initial pose 405 selected in the block 620 by minimizing the reprojection error, as described above.

Next, in a decision block 630, the computer 105 determines whether any initial poses 405 remain for which final poses have not been determined. For example, the computer 105 can determine whether the index of the initial pose 405 selected in the block 620 is the largest index. If there are remaining initial poses 405, the process 600 returns to the block 620 to proceed to the next initial pose 405. If there are no initial poses 405 remaining, the process 600 proceeds to a block 635.

In the block 635, the computer 105 selects the first final pose from the final poses, as described above. The first final pose is the final pose having the lowest minimized reprojection error of the final poses.

Next, in a decision block 640, the computer 105 determines whether the lowest minimized reprojection error exceeds a threshold, as described above. If so, the process 600 proceeds to a block 645. If not, the process 600 proceeds to a block 650.

In the block 645, the computer 105 discards the first final pose, as described above. After the block 645, the process 600 returns to the block 610 for the computer 105 to re-identify the landmarks 205 in the image frames 200 and redo the rest of the process 600.

In the block 650, the computer 105 projects the final pose from the reference frame of the camera 110 that captured the reference image frame 200 to the cameras 110 that captured the other image frames 200 using the transformation matrices $[R_n|T_n]$ for the respective cameras 110.

Next, in a block 655, the computer 105 determines the waypoints 500 based on the first final pose, as described above.

Next, in a block 660, the computer 105 transmits the message to the vehicle 115 so that the vehicle 115 can use the message for actuating the vehicle 115 to travel through the facility 100, as described above. Alternatively or additionally, the computer 105 can instruct a component of the facility 100 to actuate based on the first final pose, as described above. After the block 660, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc.

have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive an image frame from a camera, the image frame showing a vehicle;
   determine at least one baseline pixel coordinate within the image frame for the vehicle;
   at a single time, initialize a plurality of initial poses for the vehicle in a preset pattern;
   for each of the plurality of initial poses, determine a respective final pose by minimizing a reprojection error between the at least one baseline pixel coordinate and at least one respective estimated pixel coordinate, the at least one respective estimated pixel coordinate resulting from reprojecting the vehicle to pixel coordinates in the image frame; and
   select a first final pose from the final poses, the first final pose having the lowest minimized reprojection error of the final poses.

2. The computer of claim 1, wherein the instructions further include instructions to transmit a message to the vehicle based on the first final pose, the message usable for actuating the vehicle.

3. The computer of claim 2, wherein the instructions further include instructions to determine at least one waypoint based on the first final pose, and the message to the vehicle includes the at least one waypoint.

4. The computer of claim 1, wherein the initial poses and final poses each include two horizontal spatial dimensions and yaw.

5. The computer of claim 4, wherein the initial poses and final poses each include a vertical spatial dimension, roll, and pitch.

6. The computer of claim 1, wherein the preset pattern is a grid.

7. The computer of claim 1, wherein the instructions further include instructions to identify at least one landmark of the vehicle in the image frame, the at least one baseline pixel coordinate being of the at least one landmark, and the estimated pixel coordinates being of the at least one landmark.

8. The computer of claim 7, wherein the at least one landmark includes a plurality of landmarks, the at least one baseline pixel coordinate includes a plurality of respective baseline pixel coordinates, and the estimated pixel coordinates include, for each baseline pixel coordinate, a plurality of respective estimated pixel coordinates.

9. The computer of claim 7, wherein the instructions further include instructions to, upon determining that the lowest minimized reprojection error exceeds a threshold, re-identify the at least one landmark in the image frame.

10. The computer of claim 7, wherein identifying the at least one landmark includes executing a machine-learning program.

11. The computer of claim 1, wherein the instructions further include instructions to, upon determining that the lowest minimized reprojection error exceeds a threshold, discard the first final pose.

12. The computer of claim 1, wherein the image frame is a first image frame, the camera is a first camera, the instructions further include instructions to receive a second image frame from a second camera, and the at least one baseline pixel coordinate includes a first baseline pixel coordinate in the second image frame.

13. The computer of claim 12, wherein the second image frame is time-synchronized with the first image frame.

14. The computer of claim 12, wherein the at least one respective estimated pixel coordinate includes a first estimated pixel coordinate corresponding to the first baseline pixel coordinate.

15. The computer of claim 12, wherein the instructions further include instructions to identify a first landmark of the vehicle in the first image frame and a second landmark of the vehicle in the second image frame, the at least one baseline pixel coordinate being of the first and second landmarks, and the estimated pixel coordinates being of the first and second landmarks.

16. The computer of claim 15, wherein the second landmark is outside the first image frame.

17. The computer of claim 1, wherein reprojecting the vehicle to pixel coordinates in the image frame is based on a three-dimensional model of the vehicle.

18. The computer of claim 1, wherein minimizing the reprojection error includes performing iterative optimization.

19. The computer of claim 1, wherein the camera is positioned above the vehicle and oriented facing downward.

20. A method comprising:
   receiving an image frame from a camera, the image frame showing a vehicle;
   determining at least one baseline pixel coordinate within the image frame for the vehicle;
   at a single time, initializing a plurality of initial poses for the vehicle in a preset pattern;
   for each of the plurality of initial poses, determining a respective final pose by minimizing a reprojection error between the at least one baseline pixel coordinate and at least one respective estimated pixel coordinate, the at least one respective estimated pixel coordinate resulting from reprojecting the vehicle to pixel coordinates in the image frame; and
   selecting a first final pose from the final poses, the first final pose having the lowest minimized reprojection error of the final poses.

* * * * *